United States Patent [19]

Rendleman

[11] 3,919,949

[45] Nov. 18, 1975

[54] MILLING MACHINE TOOL TRAY

[76] Inventor: Thomas G. Rendleman, 337 S. Stevenson, Olathe, Kans. 66061

[22] Filed: Sept. 23, 1974

[21] Appl. No.: 508,451

[52] U.S. Cl. .................. 108/27; 51/268; 108/5; 108/143; 211/162
[51] Int. Cl.² .................................. A23D 7/08
[58] Field of Search .......... 108/27, 102, 90, 92, 59, 108/143, 138, 1, 5, 6; 312/281; 29/200 R; 51/268, 272; 211/162, 184; 82/36 R, 35

[56] References Cited
UNITED STATES PATENTS

| 596,762 | 1/1898 | Sevison | 51/272 |
|---|---|---|---|
| 1,652,744 | 12/1927 | Frasier et al. | 108/27 X |
| 2,622,952 | 12/1952 | Wilhide | 108/27 X |
| 2,678,489 | 5/1954 | Ratzlaff et al. | 312/281 X |
| 3,415,477 | 12/1968 | Kondur, Jr. | 211/162 X |

Primary Examiner—James T. McCall
Attorney, Agent, or Firm—Lowe, Kokjer, Kircher

[57] ABSTRACT

A combination tool tray and chip guard is adapted for utilization with a milling machine table to provide a storage area for tools and the like. A pair of spaced supporting blocks extend from the bottom of the tray and are received in the T-shaped slots of the machine table to cooperate with a pair of bosses in supporting the tray above the table surface. A roll pin is carried on each block to ride within the horizontal portion of each T-slot and permit movement of the tray along the length of the table. The tray is selectively pivotal about the roll pin axis to a vertical position to permit same to function as a guard against flying chips and shavings.

4 Claims, 3 Drawing Figures

MILLING MACHINE TOOL TRAY

BACKGROUND AND SUMMARY OF THE INVENTION

This invention is concerned with a tool tray that is installed on a milling machine table.

Various tools are required in order to effect the adjustments that must frequently be made on the components of milling machines. It is also common for precision instruments such as micrometers and the like to be employed in connection with milling operations. When not in use, the tools and instruments are typically stored at random positions in the vicinity of the machine and are therefore difficult to locate when needed. The tools are often placed on the machine table where they are apt to interfere with the operation of the machine. In addition, precision instruments are likely to be damaged if carelessly placed on the machine table, and the various tools may severely scratch or mar the table.

Consequently, it is a principal object of the present invention to provide a tool tray for a milling machine that permits tools and instruments to be conveniently stored when not in use. It is a particular feature of the invention that the tool tray is installed on the machine table where the tools and instruments may be easily located when needed.

Another object of this invention is to provide a tool tray of the character described that presents a relatively soft surface so as not to damage precision instruments.

Still another object of the invention is to provide a tool tray of the character described that protects the milling machine table against damage. In conjunction with this object, it is a feature of the invention that the tool tray is spaced above the machine table to thereby insulate the table from both the tray and the tools.

Yet another object of the invention is to provide a tool tray of the character described that is readily movable to various positions so as not to interfere with the operation of the milling machine.

A further object of the invention is to provide a tool tray of the character described that functions alternatively as a guard against the chips and shavings associated with milling operations.

A still further object of the invention is to provide a tool tray of the character described that is constructed ruggedly, yet economically.

Other and further objects of the invention, together with the features of novelty appurtenant thereto, will appear in the course of the following description.

Detailed Description of the Invention

In the accompanying drawing which forms a part of the specification and is to be read in conjunction therewith, like reference numerals are employed to indicate like parts in the various views.

Figure 1:
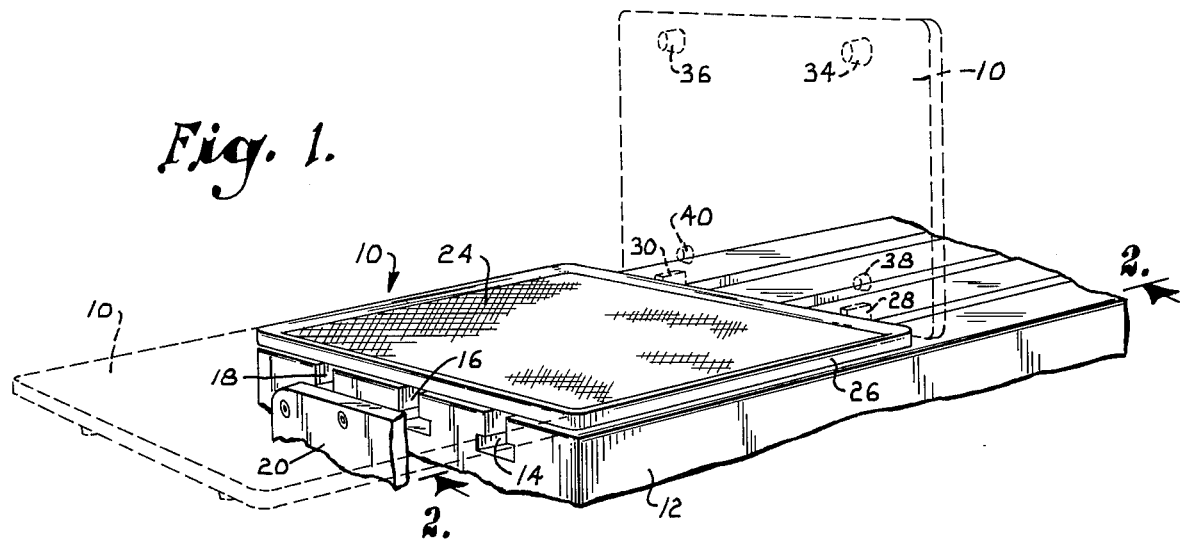
FIG. 1 is a perspective view showing a tool tray embodying the invention installed on a milling machine table, with the two broken line views illustrating alternative positions of the tool tray.

Referring now to the drawing in detail, a tool tray 10 is installed on a conventional milling machine table 12 to receive tools and other instruments that are used in conjunction with milling processes. Table 12 is of the usual construction and has three parallel slots 14, 16 and 18 formed in its horizontal top surface. Slots 14, 16 and 18 are in the shape of an inverted T and extend the length of table 12. The T-slots normally receive nut and bolt assemblies (not shown) which attach to a vise clamping device (also not shown) that holds the work that is to be milled. A plate-like bracket 20 having a flat top edge is secured to each end of table 12 in a location to cover the lower end portion of each T-slot. The respective brackets 20 support the opposite ends of a threaded shaft (not shown) which is included in a conventional feed mechanism. An operating handle 22 (FIG. 2) is secured to each end of the shaft to rotate the same.

The tool receiving portion of tray 10 comprises a substantially square plate 24 having an upwardly disposed, grid-like surface formed by a plurality of small ridges. The ridges are arranged in an interconnected meshwork pattern and project upwardly from plate 24 to resist any tendency of objects to slide on the plate. A continuous peripheral border or rim 26 surrounds plate 24 and projects upwardly around the periphery thereof to retain objects on the grid surface. Tray 10 is preferably large enough to extend entirely across the width of table 12 and is preferably constructed of plastic or a similar material that is relatively soft, yet sturdy.

Figure 2:
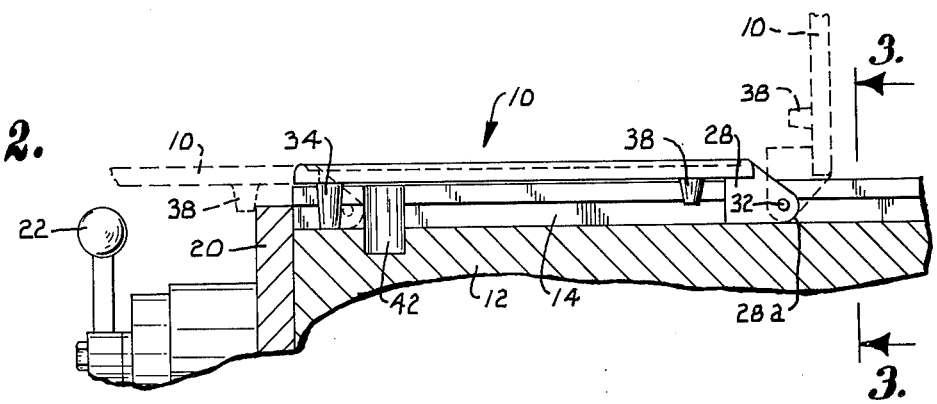
FIG. 2 is a fragmentary, cross-sectional view taken generally along line 2—2 of FIG. 1 in the direction of the arrows.
Figure 3:
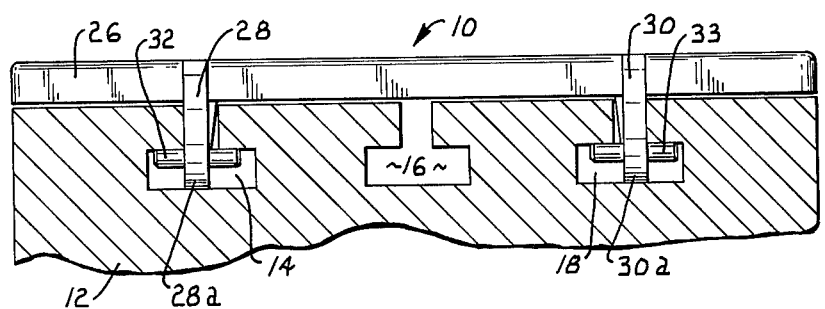
FIG. 3 is an enlarged, fragmentary, cross-sectional view taken generally along line 3—3 of FIG. 2 in the direction of the arrows.

A pair of relatively thin, irregularly shaped blocks 28 and 30 are formed integrally on the bottom of tool tray 10 at the back edge thereof. Blocks 28 and 30 are constructed identically and sized and spaced appropriately to extend downwardly into the respective end slots 14 and 18. With reference to FIG. 2, block 28 includes a straight front edge that extends downwardly from the bottom of tray 10. A flat bottom edge extends rearwardly from the lower end of the front edge and terminates in a rounded rear edge 28a. A flat edge angles upwardly and forwardly from rounded edge 28a to join integrally with the back edge of tray 10. Block 30 is of identical configuration, having a straight front edge, a flat bottom edge, a rounded rear edge 30a (FIG. 3), and a flat angled edge extending upwardly and forwardly from rounded edge 30a to integrally join the back edge of tray 10. The flat lower edges of blocks 28 and 30 normally engage the bottom ends of T-slots 14 and 18, and the blocks are of a height to support the back end of tray 10 a short distance above table 12. Consequently, the back end of the tray does not engage the table surface but is instead supported above table 12 from the bottom of the T-slots.

The respective rounded rear edges 28a and 30a of blocks 28 and 30 are shaped to permit tray 10 to be readily pivoted to the vertical position shown in broken lines in FIGS. 1 and 2. Inwardly of rounded edge 28a, block 28 is provided with a transverse opening in which a cylindrical roll pin 32 is received. Pin 32 is equidistant from all portions of edge 28a to provide a central pivot axis about which edge 28a is permitted to slide on the bottom of slot 14. Pin 32 is located within the horizontal portion of the slot 14, and the majority of the roll pin bears upwardly against the interior surface of table 12 presented above the horizontal portion of slot 14.

The opposite block 30 is similarly bored at a corresponding location centrally inwardly of its rounded edge 30a to receive a roll pin 33 (FIG. 3) which bears upwardly against the interior table surface presented above the horizontal portion of slot 18. The two roll pins 32 and 33 cooperate with blocks 28 and 30 to resist any tendency of tray 10 to become disoriented or detached from table 12. Also, roll pins 32 and 33 permit tray 10 to be readily moved along table 12 and are axially aligned to provide a pivot axis about which the tray may be pivoted to the vertical position shown in broken lines in FIGS. 1 and 2.

A pair of frustoconical bosses 34 and 36 extend downwardly near the front edge of tray 10 and are spaced and sized to be received in the respective T-slots 14 and 18. The flat bottom end of boss 34 engages the bottom of slot 14 when tray 10 is in the solid line position of FIGS. 1 and 2, and the boss is of a length to support the front end of the tray slightly above the top surface of table 12. Similarly, boss 36 engages the bottom of slot 18 to support the front end of the tray slightly above the machine table. Blocks 28 and 30 and bosses 34 and 36 are of equal height to normally maintain tray 10 in a horizontal disposition above table 12.

A pair of smaller frustoconical bosses 38 and 40 having flat bottom ends extend integrally from the bottom surface of tray 10 somewhat forwardly of the respective blocks 28 and 30. Bosses 38 and 40 are spaced to extend into T-slots 14 and 18 but are short enough so as not to engage the bottom of the slots. In actual practice, it is contemplated that a second and identical tray 10 will be installed on the opposite end of table 12.

In use, tool tray 10 has three operative positions. The tray is normally located in the solid line position of FIG. 1 wherein it extends across the width of table 12, preferably at one end thereof, although it may be positioned anywhere desired along the table length. Various tools and instruments may be temporarily stored between use on the tray, which presents a relatively soft surface so that the instruments will not be damaged. The grid surface of plate 24 opposes sliding movement of objects placed thereon, while rim 26 keeps objects from sliding off of tray 10. It is noted that the tray is spaced above table 12 so that the surface of the table is insulated and cannot be scratched or marred by either the tray or the tools.

Tray 10 may be moved along the length of machine table 12 with the tools still retained thereon. As the tray is moved along table 12, the flat bottomed edges of blocks 28 and 30 slide along the bottom slots 14 and 18, while the associated roll pins 32 and 33 bear against the interior surfaces presented above the horizontal portions of slots 14 and 18. It is again noted that tray 10 does not engage the table surface even as it is moved. When tray 10 is located in the overhanging position shown in broken lines in FIGS. 1 and 2, blocks 28 and 30 are disposed outwardly of the large opening 42 (FIG. 2) which extends transversely between slots 14, 16 and 18. Opening 42 is therefore exposed to permit insertion or removal of the nut and bolt assemblies into the T-slots. The small bosses 38 and 40 engage the forward top portion of bracket 20 and thereby assist in supporting tray 10 in its horizontal, overhanging position. After the nut and bolt assemblies have been inserted and positioned appropriately at an inward portion of table 12, tray 10 may either be left in its overhanging position, or it may again be moved inwardly to its normal solid line position wherein the tools are conveniently located.

Tool tray 10 may also be used as a guard against the chips and shavings that are removed during milling processes. The tray may be readily pivoted about the pivot axis defined by roll pins 32 and 33 to the erect or slightly past center position shown in broken lines in FIGS. 1 and 2, with the rounded edges 28a and 30a of blocks 28 and 30 facilitating the pivotal movement. In the erect position, tool tray 10 presents a large surface which acts as a barrier to intercept chips and shavings and prevent them from being propelled randomly about the vicinity of the machine. Of course, the tool tray may be disposed in an erect position in any desired location along the length of the table.

From the foregoing, it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A tray for installation on a milling machine table having an upper surface with a plurality of inverted, T-shaped slots formed therein, said tray comprising:
   a tray member, said tray member presenting a substantially horizontal surface adapted to receive loose tools thereon for temporary storage;
   at least one support for said tray member located in proximity to one end thereof, said support being of a configuration to slidably fit within one of said slots to support said tray member for free sliding movement relative to said table, said support being of a length to engage the bottom of said slot to support said one end of said tray member a spaced distance above said upper table surface; and
   at least one leg member extending downwardly from said tray member at a location offset from said support and in proximity to the end of said tray member opposite from said one end thereof, said leg member being received in one of said slots and engaging the bottom thereof to support said opposite end of said tray member a spaced distance above said upper table surface, said support and leg member thereby cooperating to space said tray member above said table in a substantially horizontal disposition.

2. A tray as defined in claim 1, wherein said support includes a rounded surface and a pin member disposed transversely in said slot, said tray member being adapted for selective pivotal movement about the axis of said pin member to a substantially vertical position with said rounded surface engaging the bottom of said slot to facilitate said pivotal movement.

3. A tray for installation on a milling machine table having a plurality of inverted, T-shaped slots therein, said tray comprising:
   a tray member, said tray member presenting a substantially horizontal surface adapted to receive tools thereon;

at least one support extending from said tray member and slidably fitting within one of said slots to support said tray member for sliding movement relative to said table, said support having a portion thereof disposed transversely in said slot to provide a pivot axis permitting pivotal movement of said tray member to a substantially vertical position, said support further including a rounded surface engageable with the bottom of said slot to facilitate said pivotal movement; and at least one leg member extending downwardly from said tray member at a location offset from said support, said leg member being removably received in one of said slots and engaging the bottom thereof to cooperate with said support in supporting said tray member in a substantially horizontal orientation.

4. A tray for installation on a milling machine table having a plurality of inverted, T-shaped slots therein, said tray comprising:

a tray member presenting an upper surface, said tray member having a substantially horizontal position wherein tools are receivable on said upper surface; and a pair of supports extending from said tray member at spaced locations and slidably fitting within a pair of said slots to support said tray member for sliding movement relative to said table, said supports including respective pin members disposed transversely in said slots and axially aligned with one another to define a pivot axis permitting pivotal movement of said tray member to a substantially vertical position.

* * * * *